US010690030B2

United States Patent
Ahn et al.

(10) Patent No.: US 10,690,030 B2
(45) Date of Patent: Jun. 23, 2020

(54) FLAME-ASSISTED FUEL CELL INTEGRATED RICH BURN, QUICK MIX, LEAN BURN COMBUSTION FOR REDUCED NOX

(71) Applicants: Jeongmin Ahn, Syracuse, NY (US);
Ryan Milcarek, Syracuse, NY (US)

(72) Inventors: Jeongmin Ahn, Syracuse, NY (US);
Ryan Milcarek, Syracuse, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 54 days.

(21) Appl. No.: 16/117,590

(22) Filed: Aug. 30, 2018

(65) Prior Publication Data

US 2019/0063283 A1 Feb. 28, 2019

Related U.S. Application Data

(60) Provisional application No. 62/551,961, filed on Aug. 30, 2017.

(51) Int. Cl.
| | | |
|---|---|---|
| *F01N 3/08* | (2006.01) | |
| *H01M 8/00* | (2016.01) | |
| *H01M 8/0662* | (2016.01) | |
| *H01M 8/243* | (2016.01) | |
| *H01M 8/2475* | (2016.01) | |
| *H01M 8/04014* | (2016.01) | |
| *H01M 8/04082* | (2016.01) | |
| *H01M 8/04007* | (2016.01) | |
| *H01M 8/124* | (2016.01) | |

(52) U.S. Cl.
CPC .......... *F01N 3/0892* (2013.01); *H01M 8/004* (2013.01); *H01M 8/04022* (2013.01); *H01M 8/04074* (2013.01); *H01M 8/04201* (2013.01); *H01M 8/0662* (2013.01); *H01M 8/243* (2013.01); *H01M 8/2475* (2013.01); *F01N 2240/32* (2013.01); *F01N 2570/14* (2013.01); *H01M 2008/1293* (2013.01); *H01M 2250/20* (2013.01)

(58) Field of Classification Search
CPC ............... F01N 3/0892; F01N 2240/32; F01N 2570/14; H01M 8/004; H01M 8/04022; H01M 8/04074; H01M 8/04201; H01M 8/0662; H01M 8/243; H01M 8/2475; H01M 2008/1293
See application file for complete search history.

(56) References Cited

U.S. PATENT DOCUMENTS

2014/0363776 A1* 12/2014 Ahn .................... H01M 8/0631
432/92

* cited by examiner

*Primary Examiner* — Audrey K Bradley
(74) *Attorney, Agent, or Firm* — Bond Schoeneck and King PLLC; David Nocilly

(57) ABSTRACT

A micro-tubular flame assisted fuel cell (mT FFC) integrated with a rich-burn, quick-mix, lean-burn (RQL) combustor for reduced NOx. Fuel and oxidant pass into a first-stage, fuel-rich combustion chamber. The exhaust products pass to the fuel cell for electrochemical conversion. Any remaining fuel is quickly mixed in a jet of oxidant to reduce temperature gradients and NOx formation in a second stage, fuel-lean combustion chamber. Preheating of the fuel, and different oxidant streams, is possible via heat exchangers in the fuel-rich and fuel-lean combustion chambers.

16 Claims, 10 Drawing Sheets

FLAME-ASSISTED FUEL CELL INTEGRATED RICH BURN, QUICK MIX, LEAN BURN COMBUSTION FOR REDUCED NOX

CROSS-REFERENCE TO RELATED APPLICATIONS

The present application claims priority to U.S. Provisional Application No. 62/551,961, filed on Aug. 30, 2017.

BACKGROUND OF THE INVENTION

1. Field of the Invention

The present invention relates to fuel cells and, more specifically, to the design for a micro-tubular flame-assisted fuel cell having reduce NOx formation.

2. Description of the Related Art

Combustion based technologies for power generation, heating application, and transportation devices depend upon various burner configurations. While there are many options for burners, not all burners are the same. Increasing concern over global climate change, smog, acid rain and other damaging environmental outcomes have been closely linked to emissions from the combustion process. Among these emissions, NOx has been identified as contributing to environmental damage including smog, acid rain, and global warming. Of the different types of NOx formation mechanism, thermal NOx has been found to play a significant role with higher NOx formation occurring at high temperatures. Reducing NOx becomes challenging because of the strong temperature dependence. For example, peak NO formation occurs just lean of stoichiometry (equivalence ratio slightly less than 1). Many combustion devices avoid operation at stoichiometry because peak temperatures occur near this point which can create challenges for material degradation and system longevity. Furthermore, combustion devices typically operate in fuel lean conditions to ensure that the fuel is all utilized thus maintaining maximum fuel efficiency and not emitting any harmful fuels such as $CH_4$, which is a harmful greenhouse gas. The challenge is that NO formation peaks just lean of stoichiometry (around an equivalence ratio of 0.85-0.95). Further decreasing the equivalence ratio leads to operation near peak $NO_2$ or $NO_3$ formation. Attempting to operate at even lower equivalence ratios (less than 0.3) is not possible without a catalyst because this point is below the lean flammability limit for typical hydrocarbons, which is typically near an equivalence ratio of 0.5.

A conventional approach for NOx reduction is to first burn in a fuel-rich condition (equivalence ratio above 1). NOx formation is much lower at higher equivalence ratios because of low temperature and a lack of oxygen for NOx formation. However, accomplishing lower NOx emissions requires a secondary combustion process that burns the remaining fuel at fuel-lean conditions. This ensures complete combustion of the fuel, maximum fuel efficiency, and no damaging fuel emissions. This technology has been well developed and is referred to as rich-burn, quick-mix, lean-burn (RQL) combustion. Besides the obvious rich and lean-burn sections, the RQL combustor is dependent upon the quick-mix section to reduce NOx formation. A secondary air stream is mixed with the fuel-rich combustion exhaust and then burned. Excess oxygen is present to ensure overall lean combustion. Ideally, this would cause operation of the combustor at the rich and lean equivalence ratios and nothing in between. In reality, however, the mixing mechanism is typically not fast enough resulting in high temperatures and NOx formation. As a result, NOx formation can actually increase in some cases compared to just using a single stage burner and operating with fuel-lean combustion. For that reason, many stationary applications including furnaces and boilers typically operate in fuel-lean conditions.

BRIEF SUMMARY OF THE INVENTION

The present invention is an RQL combustor having a micro-tubular flame-assisted fuel cell. The micro-tubular flame assisted fuel cell relies on an initial fuel-rich combustion process with can reform the fuel into syngas and products of combustion. Burning in a fuel-rich condition generates significant $H_2$ and CO (syngas), which can be used directly in a micro-tubular Solid Oxide Fuel Cell (SOFC) creating a micro-tubular flame-assisted fuel cell (mT FFC). Power generation in the fuel cell reduces the remaining fuel in the exhaust and, after mixing with secondary air, results in a fuel-lean, mild combustion in the fuel cell downstream with reduced NOx formation.

More specifically, a combustion system according to the present invention comprises a first-stage combustion chamber having a fuel air mixture inlet, a burner, and an exhaust for exhausting combustion products, a solid oxide fuel cell stack having a plurality of micro-tubular fuel cells coupled to the exhaust of the burner for receiving the combustion products within the plurality of micro-tubular fuel cells, electrochemically reacting the combustion products to produce electricity, and exhausting the electrochemically reacted combustion products, an air inlet extending along the first combustion chamber and solid oxide fuel cell stack to provide preheated air to the micro-tubular solid oxide fuel cell stack, an air nozzle positioned to provide and mix air with the electrochemically reacted combustion products, and a second combustion chamber associated with the micro-tubular solid oxide fuel cell stack and the air nozzle for receiving and combusting the electrochemically reacted combustion. The combustion chamber may include a housing enclosing the first combustion chamber, the solid oxide fuel stack, and the second combustion chamber. The air inlet may extend into the housing and is in communication with a passage that extends between the housing and the first-stage combustion chamber so that heat produced by the first-stage combustion chamber will heat air flowing through the passage. The passage may extend between the housing and the solid oxide fuel cell stack so that any heated air in the passage will envelop the cathode of the plurality of the solid oxide fuel cells. The fuel air mixture inlet is adapted to provide a fuel-rich mixture for combustion within the first-stage combustion chamber. The air nozzle and solid oxide fuel cell are adapted to provide a fuel-lean mixture for combustion within the second combustion chamber. The solid oxide fuel cell stack is coupled to an electrical convertor. The second combustion chamber is coupled to a heat exchanger. The air nozzle extends transversely into the housing between the solid oxide fuel cell and the secondary combustion chamber. The air nozzle extends longitudinally into the housing through the secondary combustion chamber and terminates proximately to the solid oxide fuel cell.

The present invention also comprises a method of providing reduced NOx combustion. A first step of the method comprises providing a first-stage combustion chamber having a fuel air mixture inlet, a burner, and an exhaust for exhausting combustion products, a solid oxide fuel cell stack having a plurality of micro-tubular fuel cells coupled to the exhaust of the burner for receiving the combustion products within the plurality of micro-tubular fuel cells, electrochemically reacting the combustion products to produce electricity, and exhausting the electrochemically reacted combustion products, an air inlet extending along the first-stage combustion chamber and solid oxide fuel cell stack to provide preheated air to the micro-tubular solid oxide fuel cell stack, an air nozzle positioned to provide and mix air with the electrochemically reacted combustion products, and a second-stage combustion chamber associated with the micro-tubular solid oxide fuel cell stack and the air nozzle for receiving and combusting the electrochemically reacted combustion exhaust. Another step of the method comprises supplying a fuel-rich fuel air mixture to the fuel/air mixture inlet. A further step of the method comprises combusting the fuel-rich fuel air mixture in the first-stage combustor to produce the combustion products. An additional step of the method comprises delivering air through the air inlet so that the air is preheated and provided to the solid oxide fuel cell. A further step of the method comprises electrochemically reacting the combustion products to produce electricity and to exhaust the electrochemically reacted combustion products. Another step of the method comprises delivering air through the air nozzle to mix the air with the electrochemically reacted combustion products and produce a fuel-lean fuel/air mixture. An additional step of the method comprises combusting the fuel-lean fuel/air mixture in the second combustion chamber. The combustion chamber may include a housing enclosing the first-stage combustion chamber, the solid oxide fuel cell stack, and the second-stage combustion chamber. The air inlet may extend into the housing and be in communication with a passage that extends between the housing and the first-stage combustion chamber so that heat produced by the first-stage combustion chamber will heat air flowing through the passage. The passage may extend between the housing and the solid oxide fuel cell stack so that any heated air in the passage will envelop the plurality of micro-tubular fuel cells of the solid oxide fuel cell. The method may further comprise the step of using an electrical converter to capture electrical potential generated by the solid oxide fuel cell stack. The method may further comprise the step of using a heat exchanger to capture thermal energy in any exhaust from the second-stage combustion chamber. The air nozzle may extend transversely into the housing between the solid oxide fuel cell and the secondary combustion chamber. The air nozzle may alternatively extend longitudinally into the housing through the secondary combustion chamber and terminates proximately to the solid oxide fuel cell.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1A is a schematic of a micro-tubular flame-assisted fuel cell (mT-FFC) integrated with a rich-burn, quick-mix, lean-burn (RQL) combustor according to the present invention;

FIG. 1B is a schematic of a micro-tubular flame assisted fuel cell for integration with a rich-burn, quick-mix, lean-burn combustor according to the present invention FIG. 2 is polarization and power density curves of an mT-FFC operating at 800° C. with methane fuel-rich exhaust compositions between equivalence ratios of 1.1 and 1.4; and FIG. 3 is a graph of NO formation and expected results with a micro-tubular flame-assisted fuel cell (mT-FFC) integrated with RQL combustor according to the present invention;

Figure 9:
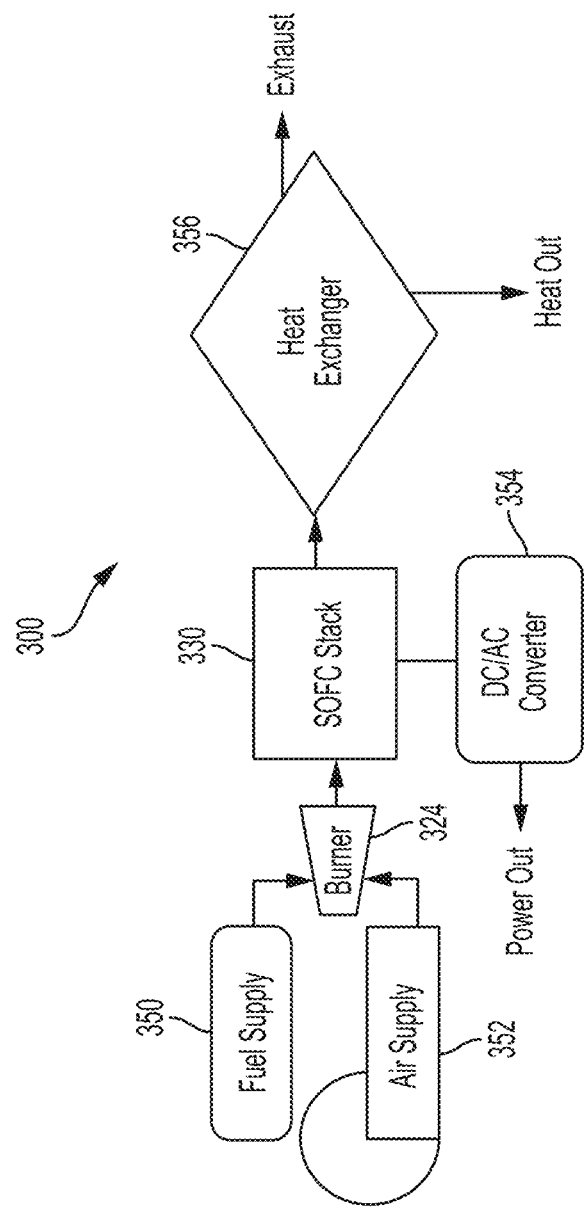
Figure 10:
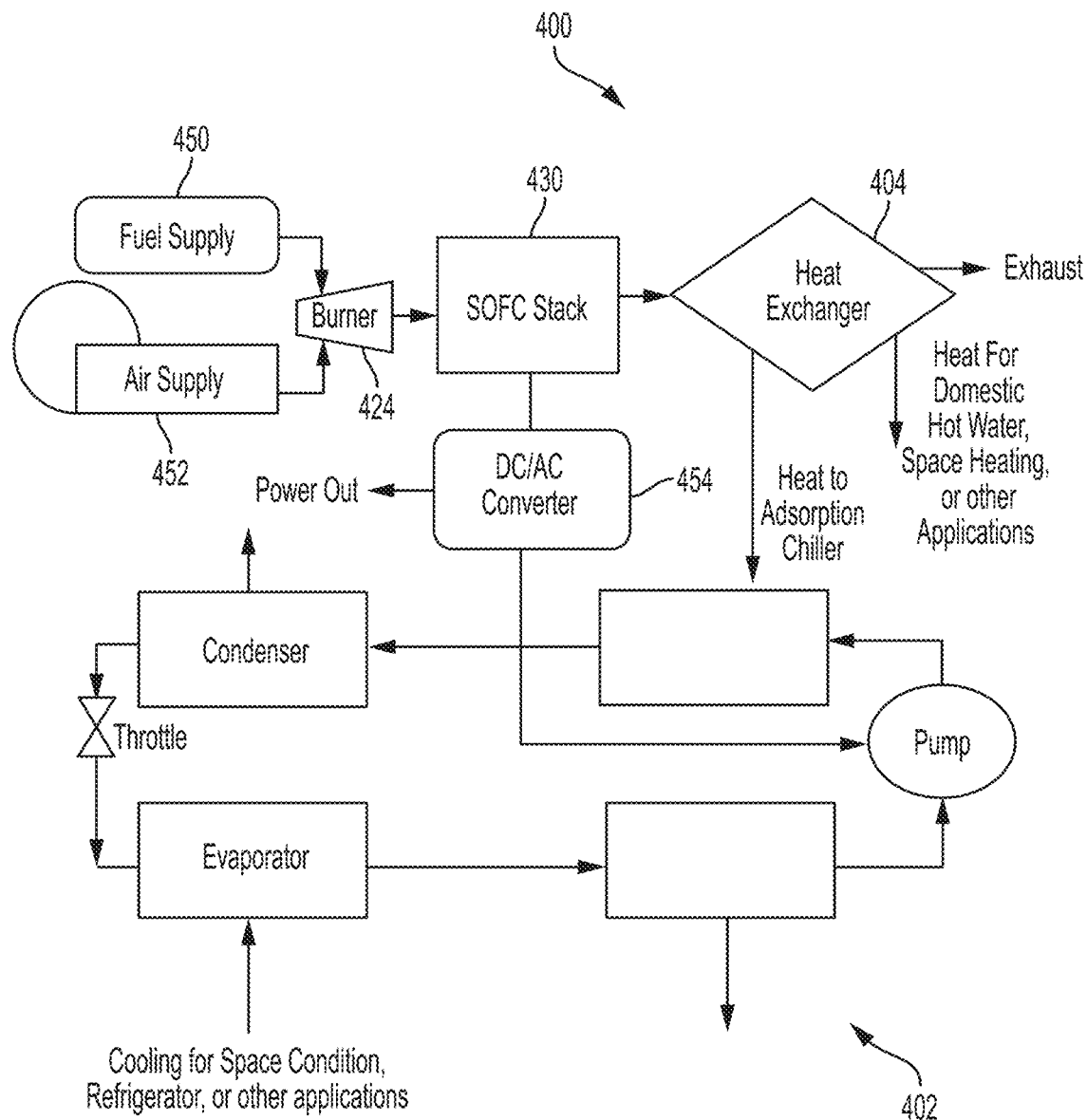

FIG. 9 a schematic of a trigeneration system incorporating a micro-tubular flame-assisted fuel cell (mT-FFC) stack according to the present invention; and FIG. 10 is a schematic of a micro-trigeneration system incorporating a micro-tubular flame assisted fuel cell (mT-FFC) stack according to the present invention.

DETAILED DESCRIPTION OF THE INVENTION

Figure 1A:
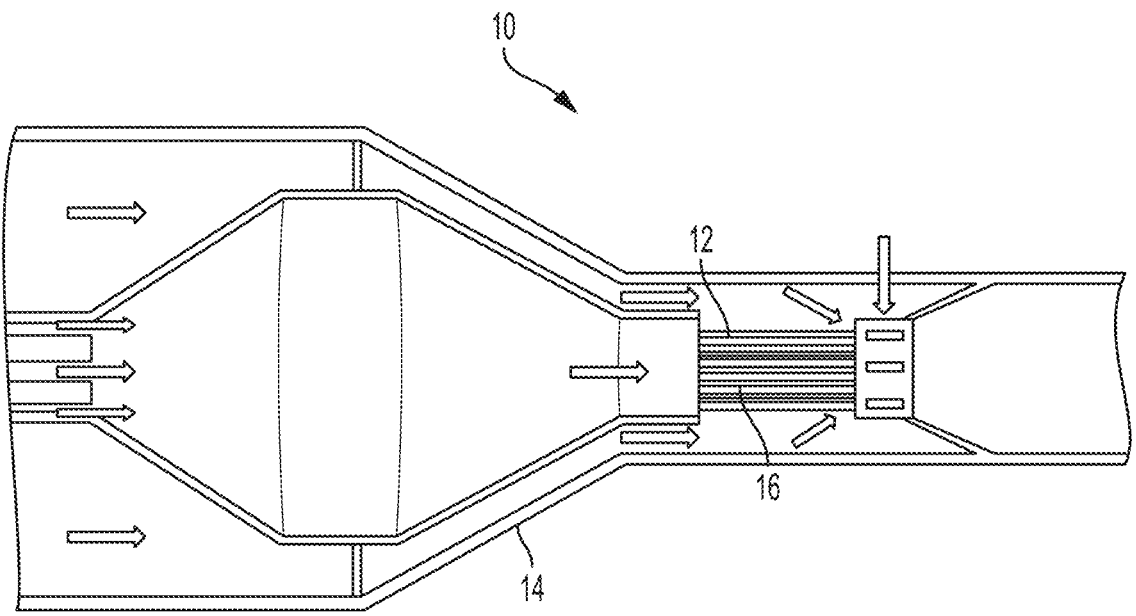
Figure 1B:
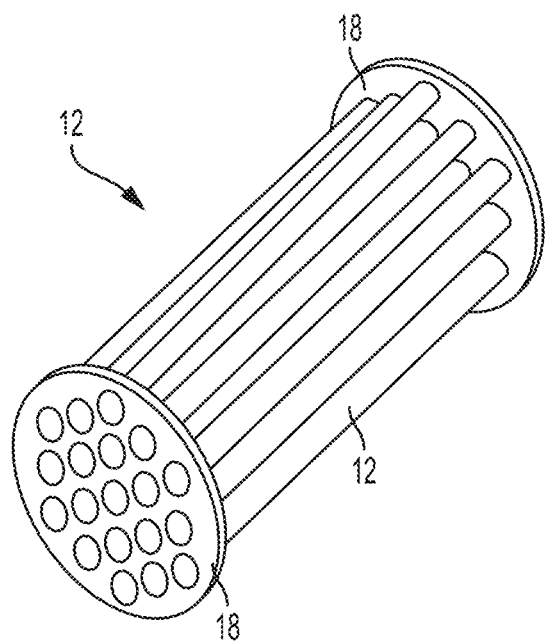

Referring to the figures, wherein like numerals refer to like parts throughout, there is seen in FIGS. 1A and 1B a combustion system 10 having a micro-tubular flame assisted fuel cell (mT FFC) 12 integrated with the exhaust of a rich-burn, quick-mix, lean-burn (RQL) combustor 14 according to the present invention. As used herein fuel-rich refers to having more fuel than necessary for stoichiometric combustion and fuel-lean refers to having less fuel than necessary for stoichiometric combustion. Referring to FIG. 2B, micro-tubular flame assisted fuel cell (mT FFC) 12 comprises a plurality of individual micro-tubes 16 arranged in a predetermined pattern between manifolds 18 that permit access to the inside of each of plurality of individual micro-tubes 16.

Figure 2:
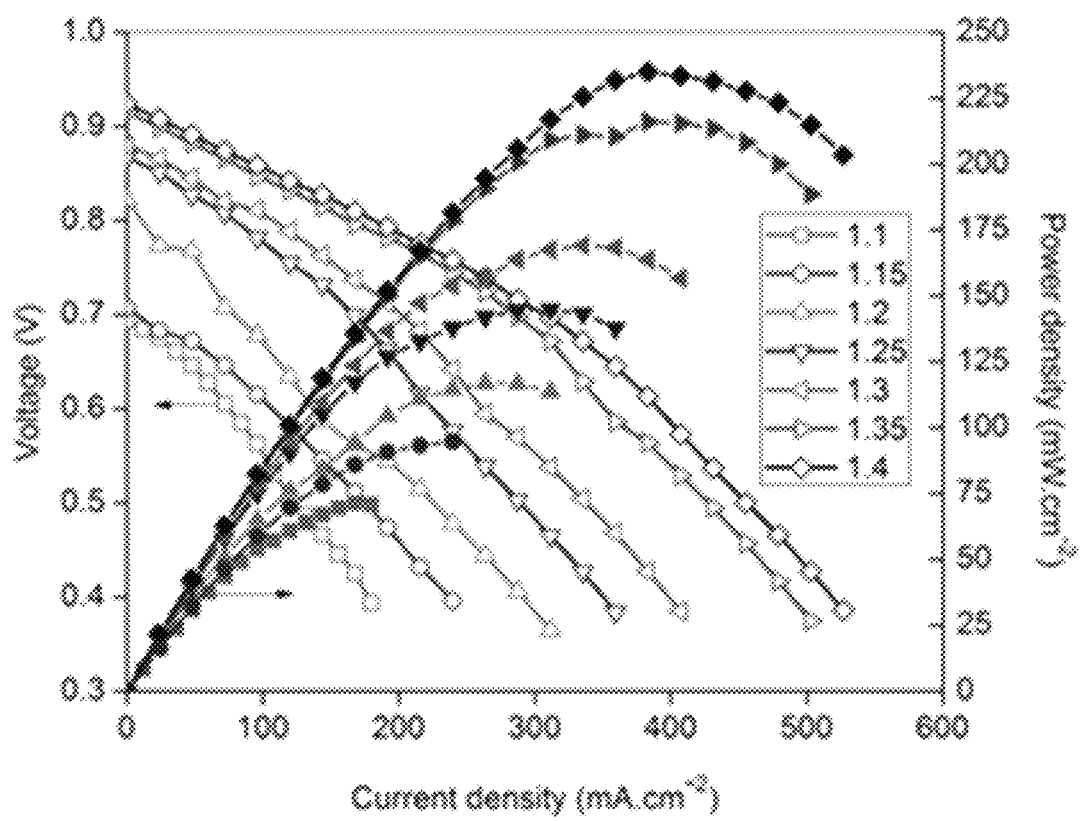

FIG. 2 shows performance data for a mT-FFC operating in the fuel-rich combustion exhaust at various equivalence ratios of the methane combustion. Complete utilization of the excess fuel in the fuel rich exhaust is typically not possible because Nernstian losses harm the fuel cells performance. As a result, some fuel is left at the end of the fuel cell. However, most of the fuel can be utilized in a properly optimized system resulting in little fuel remaining in the exhaust.

A micro tubular flame assisted fuel cell integrated with an RQL combustor has significant potential to reduce NOx formation from combustion processes. By burning in a fuel-rich condition, NOx formation is reduced due to the lower heat release and lower temperature exhaust gases. By sending the fuel-rich exhaust through a micro tubular SOFC several advantages are obtained. First, the micro-tubular SOFC has a diameter below the quenching distance of typically hydrocarbon fuels. This prevents the fuel on the inside of the micro-tubular SOFC from igniting. This is advantageous because it quenches any potential flame and prevents local hot zones that could generate NOx. Second, as the fuel-rich exhaust moves through the micro-tubular SOFC, it is electrochemically converted to water and $CO_2$. Controlling the temperature of SOFC is well developed so that the internal temperature of the SOFC is much lower than peak thermal NOx formation and NOx formation is limited. As the excess fuel in the micro tubular SOFC is electrochemically converted, the remaining exhaust mixtures moves closer to fuel-lean conditions because most of the fuel is used. Complete fuel utilization is not advisable as described previously, but most of the fuel can be used resulting in a micro tubular SOFC exhaust that is representative of the methane combustion exhaust only slightly above stoichiometry (equivalence ratio of 1).

Figure 3:
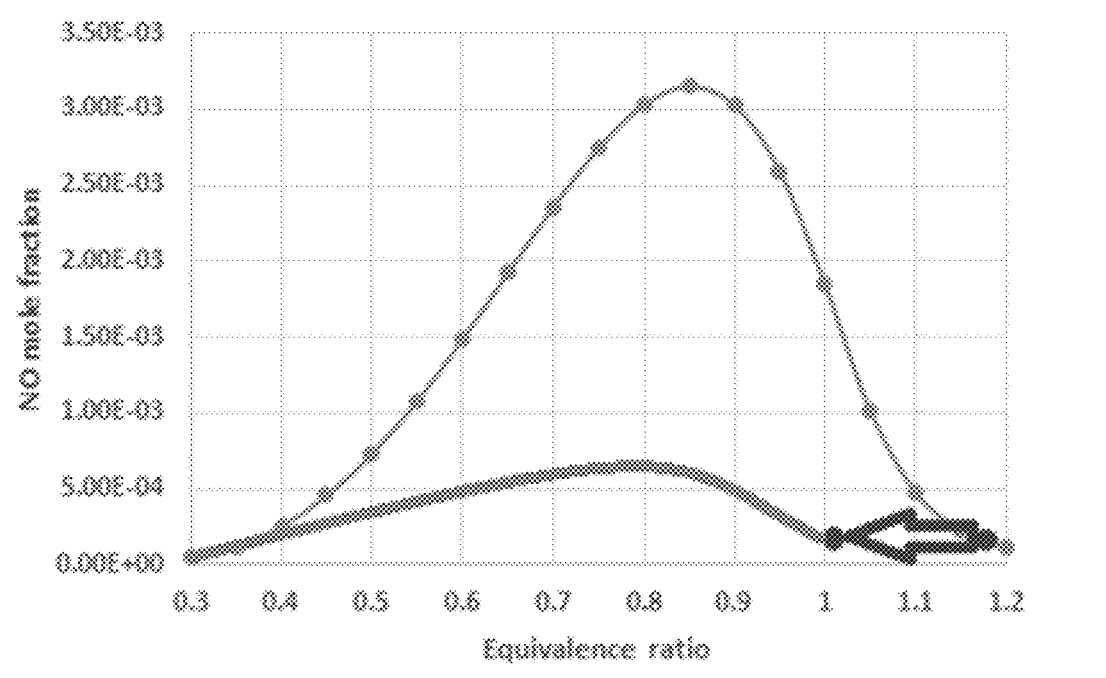

As long as the temperature is maintained at the inlet conditions, NOx formation potential remains low as shown in FIG. 3 by the arrow. The fuel remaining after a fuel-rich combustion process is utilized and the temperature in the fuel cell is kept low preventing NO formation. With high fuel utilization, most of the fuel is used up leading to an equivalence ratio close to 1 at the downstream side of the fuel cell. The initial dot in FIG. 3 represents the fuel-rich exhaust at the micro-tubular SOFC inlet while the final red point represents the exhaust at the micro-tubular SOFC exit. The green line represents NO formation as the remaining fuel is mixed with a secondary air stream and combusted in a fuel lean combustion process. The remaining fuel that was not utilized in the SOFC must be burned in the fuel-lean combustion side. This is done by mixing the micro-tubular SOFC exhaust with air. However, because the temperature is initially lower than it would be if the exhaust did not pass through the micro-tubular SOFC, the remaining fuel can be combusted and will not achieve as high of temperatures as the micro-tubular SOFC exit. Lower temperature and only a little fuel remaining for fuel-lean combustion combined with a quick mix section has the potential to drastically reduce NOx formation for the entire combustion process. This reduced potential is represented by the green line in FIG. 3.

Figure 4:
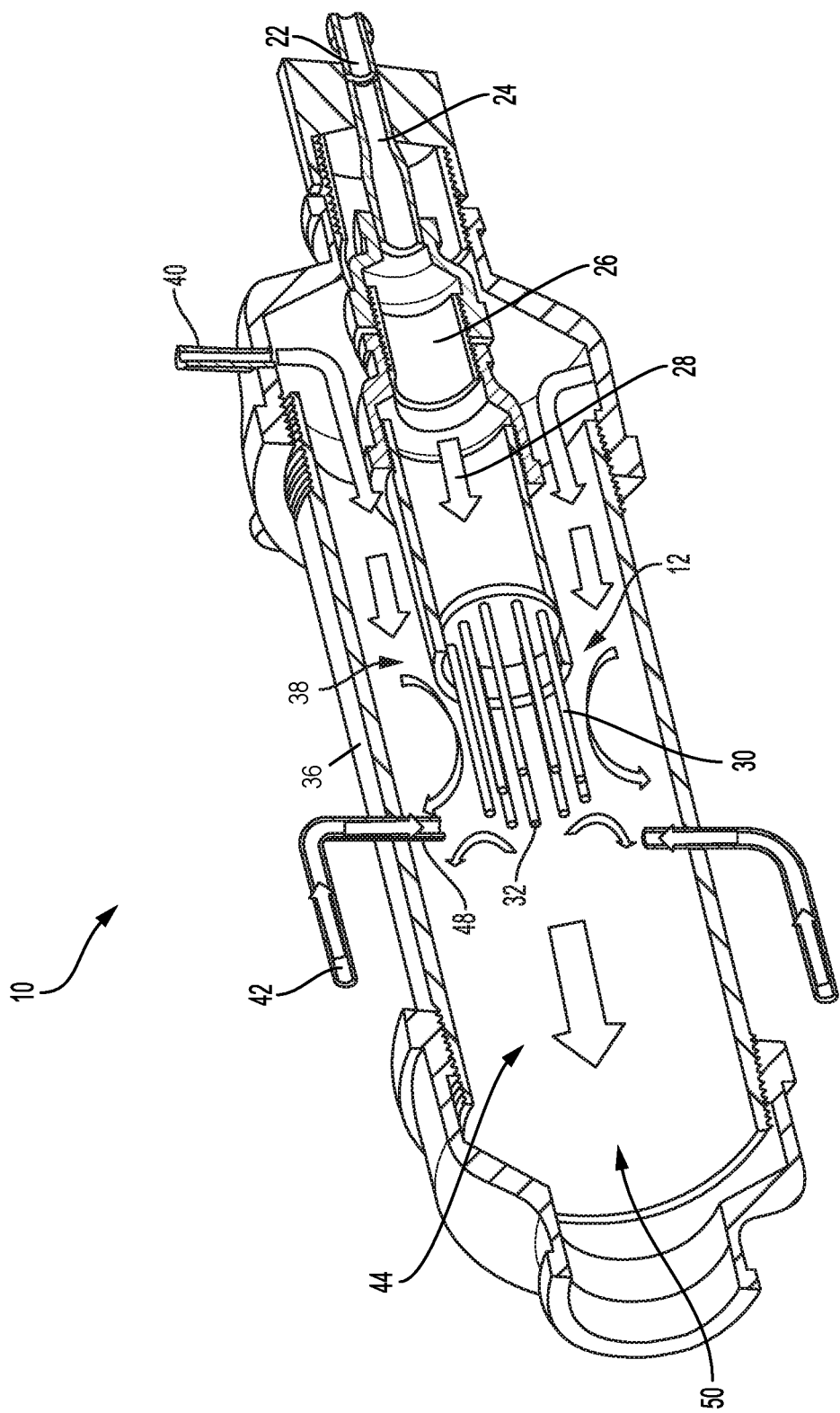
FIG. 4 is a perspective view of an embodiment of a micro-tubular flame-assisted fuel cell (mT-FFC) integrated with a rich-burn, quick-mix, lean-burn (RQL) combustor according to the present invention.
Figure 5:
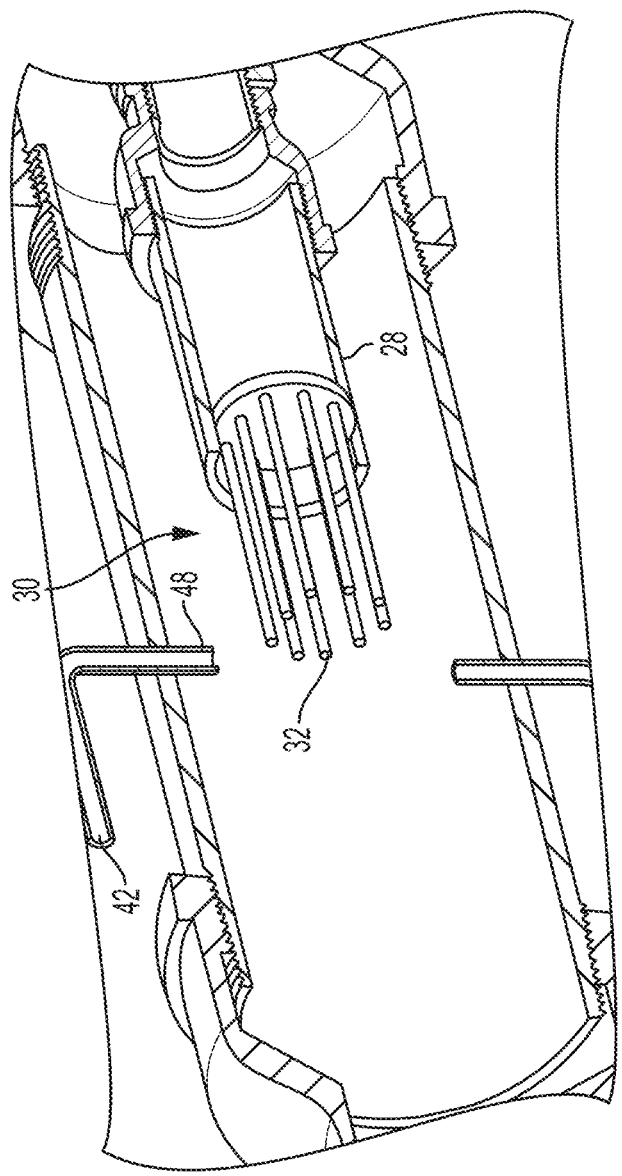
FIG. 5 is a perspective view of simple quick-mix jet to the fuel cell for rapid mixing of the remaining fuel from the fuel cell and oxidant of the embodiment seen in FIG. 4.

The present invention may be implemented using variously configured fuel cell and combustor arrangements and is not limited to tubular or planar designs. For example, there is seen in FIG. 4, one example of a rich-burn, quick-mix, lean-burn combustion system 10 with flame-assisted fuel cell 12 integrated therein. An inlet 22 for a fuel-rich, premixed fuel/air mixture is coupled to a burner 24. Burner 24 extends to a fuel-rich combustion chamber 26 having a combustion exhaust 28. Exhaust from burner 24 will include syngas. Combustion exhaust 28 is coupled to a tubular SOFC stack 30 so that the syngas containing exhaust from burner 24 is provided into each of the individual tubes 32 of stack 30 for electrochemical conversion. Combustion chamber 26 is positioned within and surrounded by a housing 36 to define a circumferential passage 38 therebetween. Housing 36 includes an inlet 40 for providing secondary air into passage 38. Secondary air provided via inlet 40 is preheated via contact with the external surface of combustion chamber 26 and combustion exhaust 28. Passage 38 extends within housing 36 around tubular SOFC stack 30 to provide the pre-heated second air needed for the electrochemical reaction of the stack 30. Quick mix air inlets 42 are positioned downstream of the stack 30 to allow for mixing of air with the exhaust from stack 30. A fuel-lean combustion chamber 44 allows for fuel-lean combustion of the quick-mix air and stack exhaust product. Thus, any remaining fuel is quickly mixed in a jet of oxidant to reduce temperature gradients and NOx formation in the second stage, fuel-lean combustion. Preheating of the fuel, and different oxidant streams, is possible via heat exchangers in the fuel-rich and fuel-lean combustion chambers. As seen in FIG. 5, a simple quick-mix jet 48 associated quick-mix air inlets 42 allows for rapid mixing of any remaining fuel from exhaust of stack 30 with additional oxidants. A final exhaust 50 allows for final combustion products to be removed from combustion chamber 46.

Figure 6:
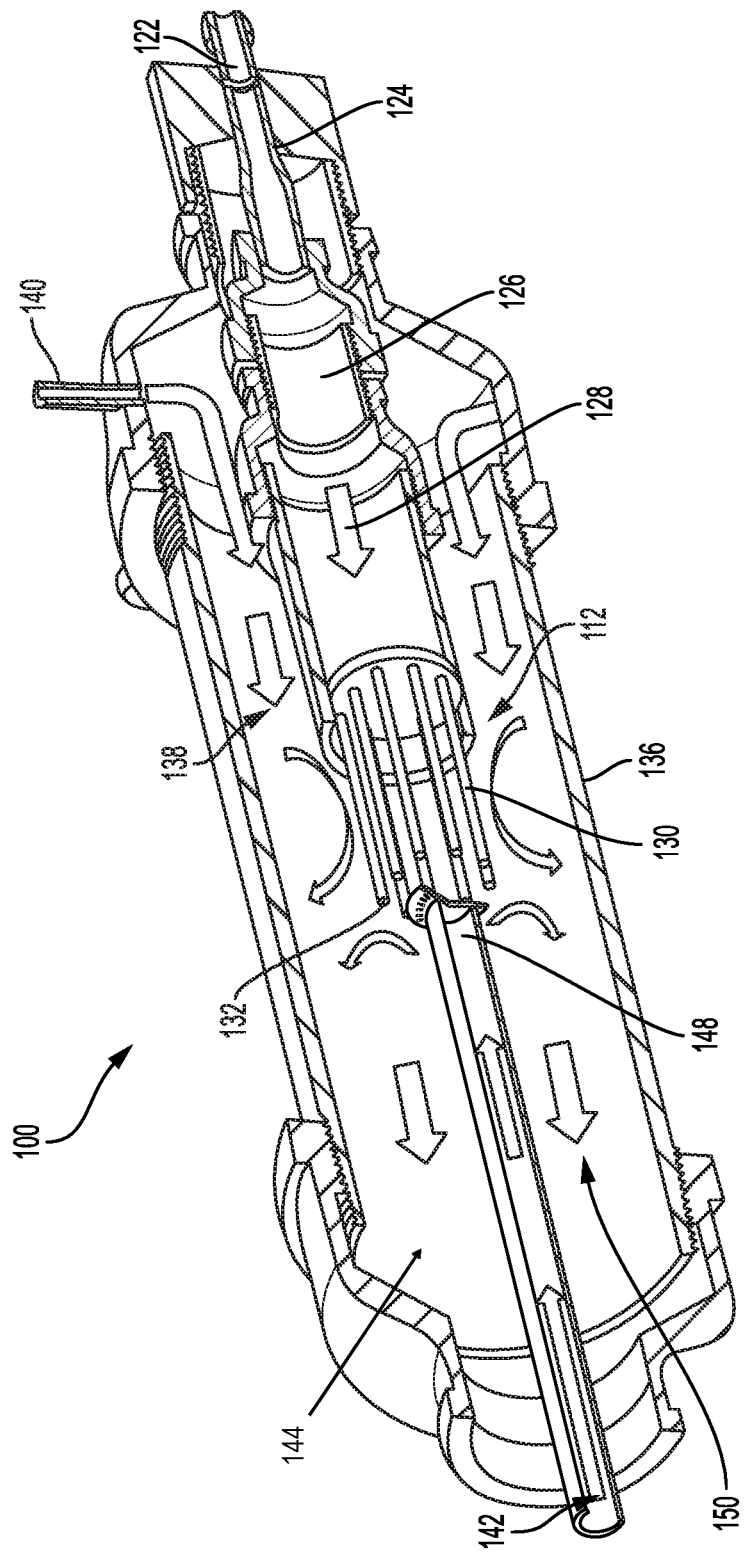
FIG. 6 is a perspective view of another embodiment of a micro-tubular flame-assisted fuel cell (mT-FFC) integrated with a rich-burn, quick-mix, lean-burn (RQL) combustor according to the present invention.
Figure 7:
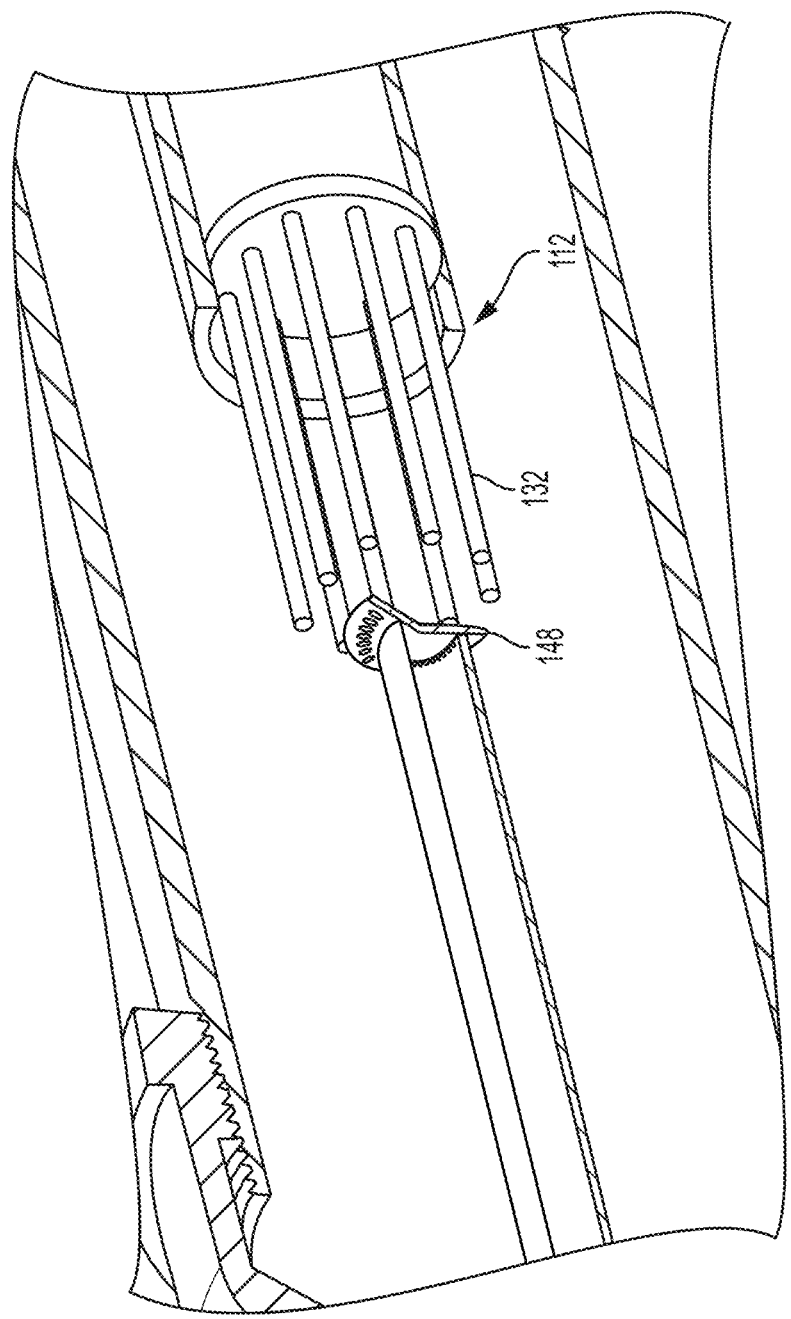
FIG. 7 is a perspective view of another simple quick-mix jet to the fuel cell for rapid mixing of the remaining fuel from the fuel cell and oxidant of the embodiment seen in FIG. 6.

Referring to FIG. 6, another embodiment of a rich-burn, quick-mix, lean-burn combustion system 100 with flame-assisted fuel cell 112 integrated therein may be seen. Combustion system 100 includes an inlet 122 for a fuel-rich, premixed fuel/air mixture is coupled to a burner 124. Burner 124 extends to a fuel-rich combustion chamber 126 having a combustion exhaust 128. Exhaust from burner 124 will include syngas. Combustion exhaust 128 is coupled to a tubular SOFC stack 130 so that the syngas containing exhaust from burner 124 is provided into each of the individual tubes 132 of stack 130 for electrochemical conversion. Combustion chamber 126 is positioned within and surrounded by a housing 136 to define a circumferential passage 138 therebetween. Housing 136 includes an inlet 140 for providing secondary air into passage 138. Secondary air provided via inlet 140 is preheated via contact with the external surface of combustion chamber 126 and combustion exhaust 128. Passage 138 extends within housing 136 around tubular SOFC stack 130 to provide the pre-heated secondary air needed for the electrochemical reaction of stack 130. A quick-mix air inlet 142 extends longitudinally into the downstream end of housing 136 and an accompanying nozzle jet 148 is positioned proximately to the exhaust side of stack 130 to provide additional air for fuel-lean combustion. A fuel-lean combustion chamber 144 allows for fuel-lean combustion of the quick-mix air and stack exhaust products. Thus, any remaining fuel is quickly mixed in a jet of oxidant to reduce temperature gradients and $NO_x$ formation in the second stage, fuel-lean combustion. Preheating of the fuel, and different oxidant streams, is possible via heat exchangers in the fuel-rich and fuel-lean combustion chambers. As seen in FIG. 7, combustion system 100 includes a simple quick-mix nozzle jet 148 to the exhaust side of stack 130 for rapid mixing of the remaining fuel from the fuel cell and oxidant prior to fuel-lean combustion.

The present invention thus provides a system having fuel cell operating between a fuel-rich combustion region and a fuel-lean combustion region with a quick-mix of oxidant to the fuel cell. The fuel-rich combustion chamber is upstream of the fuel cell inlet and supplies hydrogen, carbon monoxide or other products of combustion and heat to the fuel cell. A fuel-lean combustion chamber is downstream of the fuel cell for complete combustion of remaining fuel. The system includes a quick-mix of oxidant at the fuel cell exit or a quick-mix of oxidant prior to the fuel-lean combustion chamber. The system provides reduced $NO_x$ formation due to the fuel-rich combustion reducing $NO_x$ in the first stage because of lower temperatures, electrochemical reaction of much of the remaining fuel in the fuel cell, and little remaining fuel for the fuel-lean combustion resulting in mild combustion, lower temperatures, and reduced $NO_x$ formation. The system is designed for use with hydrocarbon fuels. The system may include an electrolyte from a group consisting of $Y_2O_3$ stabilized zirconia (YSZ), samaria doped ceria (SDC), gadolinium doped ceria (GDC), $Sc_2O_3$ stabilized $ZrO_2$ (ScSZ), Yttrium-doped barium zirconate (BZY), LSGM, and SNDC. The system may further include an interlayer from a group consisting of $Y_2O_3$ stabilized zirconia (YSZ), samaria doped ceria (SDC), gadolinium doped ceria (GDC), $Sc_2O_3$ stabilized $ZrO_2$ (ScSZ), Yttrium-doped barium zirconate (BZY), LSGM, and SNDC. The system may have an anode layer from a group consisting of NiO, $Cu+CeO_2$, and LSCM ($La_{0.7}Sr_{0.3}Cr_{0.5}Mn_{0.5}O_{3-\delta}$). The system may have a cathode layer from a group consisting of BSCF, Sr-doped $LaMnO_3$ (LSM), LSF, SSC, BLC, LSC, LSCF, LSCM, LNF, and LNC. The present invention may employ a burner for the first-stage fuel-rich combustion process. The burner can be of many different kinds including atmospheric (non-premixed), partially premixed, and premixed types. The burner for the first-stage fuel-lean combustion process may have an electric ignition or standing pilot. The quick-mix section is configured to supply oxidant for rapid mixing and complete combustion in the second-stage, fuel-lean combustion chamber. The second-stage, fuel-lean combustion chamber provides a region for complete combustion to occur and may optionally include heat exchanger for some applications. For example, the system may be used as a combustor for low $NO_x$ jet engines, as part of co-generation applications that recover the heat of combustion and fuel cell power, and in various residential, commercial and industrial applications such as hot water heaters, boilers and furnaces. The system may also be used in connection with tri-generation applications that recover the fuel cell power and heat of combustion for heating and cooling applications. This application requires a refrigeration unit such as an absorption chiller for cooling from heat recovery or an electric refrigeration unit powered by the fuel cell and can be used for various residential, commercial and industrial applications such as hot water heaters, boilers, and furnaces integrated in central systems for heating and cooling.

As discussed above, the first-stage combustion is a fuel-rich combustion in which the fuel is only partially oxidized. This fuel rich combustion results in significant generation of $H_2$, CO, $CO_2$ and $N_2$. The $H_2$ and CO, or syngas, can be utilized directly in the fuel cell according to the following anode electrochemical reactions:

$$H_2 + O^{2-} \rightarrow H_2O + 2e^- \quad (3)$$

$$CO + O^{2-} \rightarrow CO_2 + 2e^- \quad (4)$$

Figure 8:
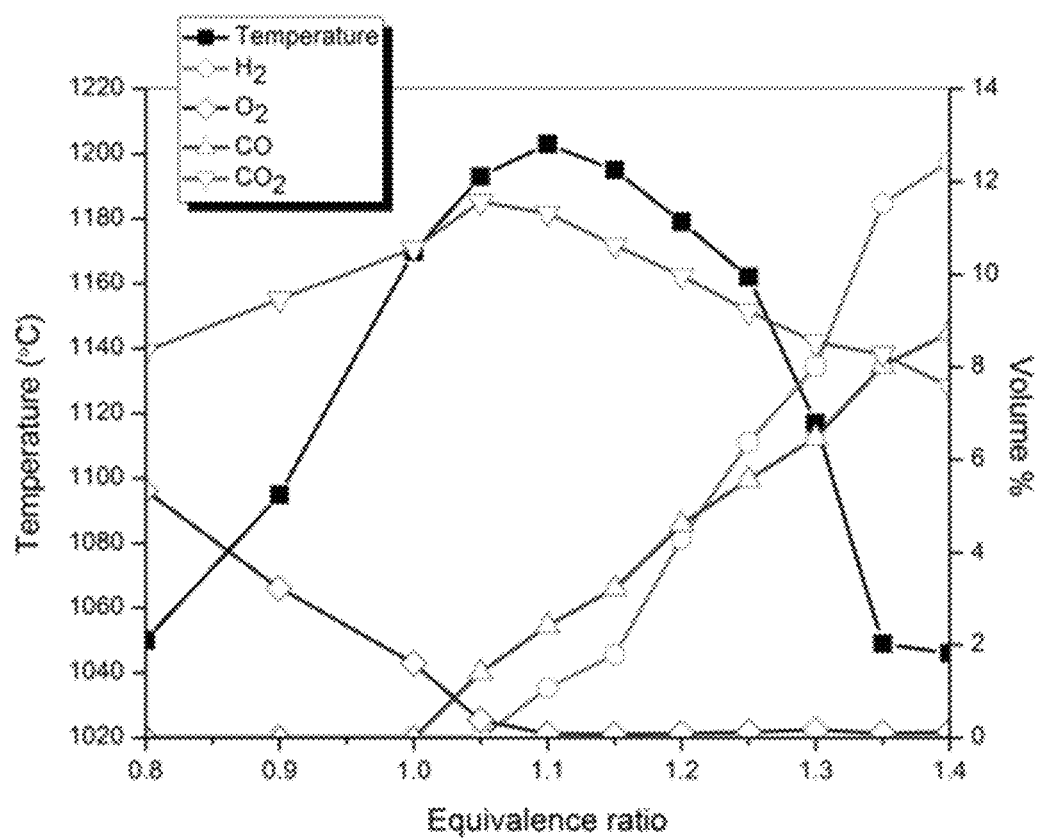
FIG. 8 is a graph of fuel-rich combustion exhaust showing variations in exhaust volume percentage with equivalence ratio.

The $N_2$ and $CO_2$ must also pass through the fuel cell, but they do not participate in the chemical reaction and simply dilute the syngas present. The equivalence ratio seen in FIG. 8 can be achieved because it is below the rich flammability limit of the methane fuel. Higher equivalence ratios can also be achieved with catalytic combustion, but the mT-FFC concept can still be utilized. In order to carefully control the equivalence ratio, the mT-FFC operates at a set equivalence ratio by fixing the fuel and air flow rates into the first-stage combustion. This results in relatively fixed percentages of syngas and other combustion byproducts as shown in FIG. 8. The fuel cell electrochemically converts much of the remaining syngas and then allows the rest to leave the SOFC into a secondary air stream for a second stage lean combustion process. This lean combustion ensures complete fuel use.

The arrangement of the present invention offers several advantages. First, the fuel reforming and thermal energy are all supplied in one fuel-rich combustion process. Instead of having separate heating equipment and a fuel reformer, the fuel-rich combustion is able to reform the fuel into syngas and other products of combustion. In addition, the heat of combustion from the first-stage provides the heat needed for operation and air preheating. In essence, the thermal management and fuel reforming are combined which greatly simplifies the system design. One of the challenges with achieving high total system efficiency with such systems is that the heat must be recovered from several points within the configuration (several heat exchangers) and a portion is used for preheating the fuels. Some of these constraints are significantly relaxed as the preheating is done in the combustion zone and all the remaining heat in the lean combustion zone can be recovered from a single point for other uses. The combined thermal management and fuel processing has the potential to simplify the system design and boost the overall efficiency of the system.

Another significant advantage is the increased fuel utilization achieved with the mT-FFC setup, which can achieve a fuel utilization of 29.1%. It should be possible to achieve greater fuel utilization as $H_2$ fuel only achieved a peak fuel utilization of 49% with the same fuel cells tested. This drastic improvement in fuel utilization (from <1% to 29.1%) is due to the increased fuel cell area relative to the combustion zone. Increasing the fuel cell area exposed to the exhaust allows for more potential for the fuel to be electrochemically converted then it would have in contact with the flame region alone. Achieving high fuel utilization allows for mT-FFC based systems to achieve high overall efficiencies which would not be possible otherwise. MT-FFCs also have the additional advantage of extremely high fuel flexibility. Because the fuel cell operates in fuel-rich exhaust, any fuel that generates $H_2$ and/or CO when partially oxidized can be used as a fuel. Solid, liquid and gaseous fuels are all options including wood, natural gas, propane, butane, methanol, ethanol, butanol and gasoline. The performance of the present invention is this regard may be seen in FIG. 2.

Referring to FIG. 9, the mT-FFC may be integrated into a trigeneration system 300 that combines cooling, heating and power for a location, such as a building. More specifically, an mT-FFC stack configuration 330 (or even a single tube) having a two stage combustion process may be used in such applications. For example, SOFC stack 330 may be positioned downstream of a burner 324 having a fuel supply 350 and air supply 352. The electrical potential across the anode and cathode of stack 330 produced by the electrochemical reaction of stack 330 is coupled to a DC/AC converter 354 to provide AC power to provide building power. The combustion exhaust of stack 330 is provided to a heat exchanger 356 to extract heat from the combustion exhaust prior to a final exhaust 358. Heat exchanger 356 may be used to provide heat for various building applications, such as hot water, space heating etc. At the same time, heat exchanger 356 can provide the heat needed for an adsorption chiller for a cooling system. Alternatively, the DC current may be used directly if desired for a particular application.

The present invention may also be used for micro-trigeneration. Micro-trigeneration, or the combined generation of cooling, heating and electricity for the residential market, is an emerging technology that is expected to become increasing important (and even a disruptive technology) as a greater need for sustainable energy generation and resilient energy supply are becoming important to consumers. Micro-trigeneration offers high overall energy efficiency and the system proposed here offers high fuel flexibility and simple integration into the current infrastructure already present in residential buildings.

Referring to FIG. 10, a micro-trigeneration system 400 may include the trigeneration system 300 of FIG. 9 acting as a hot water heater and coupled to a compression refrigeration system 402 as well as any other domestic heat appliance 404. For example, SOFC stack 430 may be positioned downstream of a burner 424 having a fuel supply 450 and air supply 452. The electrical potential across the anode and cathode of stack 430 produced by the electrochemical reaction of stack 430 is coupled to a DC/AC converter 454 to provide AC power. The combustion exhaust of stack 430 is provided to a heat exchanger 456 to extract heat from the combustion exhaust prior to a final exhaust 458. The main advantage is that hot water is typically needed year round, which means there is always a use for waste heat. In addition, there is also a need for cooling that, in warmer climates, can be present for most or all of the year. By adjusting the flow rate of fuel, the heating and/or cooling loads could be adjusted for either space cooling or heating needs. Electricity generated by system 400 may be used for many needs in the residential environment. For example, a refrigerator is a relatively consistent load that a hot water heater incorporating system 400 can power.

While there are many advantages for this system one of the significant advantages is that it combines heating, cooling and power production together. In a residential environment, usage patterns follow very similar trends with limited usage of heating, cooling and power during the day time hours when everyone is at work and during the night time hours when everyone is asleep. During the early morning hours and evening hours, demand for electricity, heating and cooling are typically all present as customers use hot water, space conditioning and electricity simultaneously for many reasons. The micro-trigeneration system can meet all of these needs simultaneously which reduces peak demand on the grid and significantly reduces the costs and infrastructure requirements for the grid. Furthermore, because the system operates on natural gas which is plentiful and about one quarter of the price of electricity per unit energy, this system has many economic benefits for residential users.

What is claimed is:

1. A combustion system, comprising:
a first combustion chamber having a fuel/air mixture inlet, a burner, and an exhaust for exhausting combustion products;
a solid oxide fuel cell stack having a plurality of micro-tubular fuel cells coupled to the exhaust of the burner for receiving the combustion products within the plurality of micro-tubular fuel cells, electrochemically reacting the combustion products to produce electricity, and exhausting the electrochemically reacted combustion products;
an air inlet extending along the first combustion chamber and solid oxide fuel cell stack to provide preheated air to the micro-tubular solid oxide fuel cell stack;
an air nozzle positioned to provide and mix air with the electrochemically reacted combustion products; and
a second combustion chamber associated with the micro-tubular solid oxide fuel cell stack and the air nozzle for receiving and combusting the electrochemically reacted combustion products;
wherein the first combustion chamber includes a housing enclosing the first combustion chamber, the solid oxide fuel cell stack, and the second combustion chamber.

2. The combustion system of claim 1, wherein the air inlet extends into the housing and is in communication with a passage that extends between the housing and the first combustion chamber so that any heat produced by the first combustion chamber will heat air flowing through the passage.

3. The combustion system of claim 2, wherein the passage extends between the housing and the solid oxide fuel cell stack so that any heated air in the passage will envelop the plurality of micro-tubular fuel cells of the solid oxide fuel cell stack.

4. The combustion system of claim 3, wherein the fuel/air mixture inlet is adapted to provide a fuel-rich mixture for combustion within the first combustion chamber.

5. The combustion system of claim 4, wherein the air nozzle and solid oxide fuel cell stack are adapted to provide a fuel-lean mixture for combustion within the second combustion chamber.

6. The combustion system of claim 5, wherein the solid oxide fuel cell stack is coupled to an electrical convertor.

7. The combustion system of claim 6, wherein the second combustion chamber is coupled to a heat exchanger.

8. The combustion system of claim 5, wherein the air nozzle extends transversely into the housing between the solid oxide fuel cell stack and the second combustion chamber.

9. The combustion system of claim 5, wherein the air nozzle extends longitudinally into the housing through the second combustion chamber and terminates proximately to the solid oxide fuel cell stack.

10. A method of providing reduced NOx combustion, comprising the steps of:
providing a first combustion chamber having a fuel air mixture inlet, a burner, and an exhaust for exhausting combustion products, a solid oxide fuel cell stack having a plurality of micro-tubular fuel cells coupled to the exhaust of the burner for receiving the combustion products within the plurality of micro-tubular fuel cells, electrochemically reacting the combustion products to produce electricity, and exhausting the electrochemically reacted combustion products, an air inlet extending along the first combustion chamber and solid oxide fuel cell stack to provide preheated air to the micro-tubular solid oxide fuel cell stack, an air nozzle positioned to provide and mix air with the electrochemically reacted combustion products, and a second combustion chamber associated with the micro-tubular solid oxide fuel cell stack and the air nozzle for receiving and combusting the electrochemically reacted combustion products, wherein the first combustion chamber includes a housing enclosing the first combustion chamber, the solid oxide fuel cell stack, and the second combustion chamber;
supplying a fuel-rich fuel air mixture to the fuel air mixture inlet;
combusting the fuel-rich fuel air mixture in the first combustion chamber to produce the combustion products;
delivering air through the air inlet so that the air is preheated and provided to the solid oxide fuel cell stack;
electrochemically reacting the combustion products to produce electricity and to exhaust the electrochemically reacted combustion products;
delivering air through the air nozzle to mix the air with the electrochemically reacted combustion products and produce a fuel-lean fuel air mixture; and
combusting the fuel-lean fuel air mixture in the second combustion chamber.

11. The method of claim 10, wherein the air inlet extends into the housing and is in communication with a passage that extends between the housing and the first combustion chamber so that heat produced by the first combustion chamber will heat air flowing through the passage.

12. The method of claim 11, wherein the passage extends between the housing and the solid oxide fuel cell stack so that any heated air in the passage will envelop the plurality of micro-tubular fuel cells of the solid oxide fuel cell stack.

13. The method of claim 12, further comprising the step of using an electrical converter to capture electrical potential generated by the solid oxide fuel cell stack.

14. The method of claim 13, further comprising the step of using a heat exchanger to capture heat energy in any exhaust from the second combustion chamber.

15. The method of claim 14, wherein the air nozzle extends transversely into the housing between the solid oxide fuel cell stack and the secondary combustion chamber.

16. The method of claim 14, wherein the air nozzle extends longitudinally into the housing through the secondary combustion chamber and terminates proximately to the solid oxide fuel cell stack.

* * * * *